(12) United States Patent
Imai et al.

(10) Patent No.: US 9,647,525 B2
(45) Date of Patent: May 9, 2017

(54) POWER SUPPLY DEVICE WITH CURRENT LIMIT BASED ON OUTPUT CURRENT AND INPUT VOLTAGE

(71) Applicants: Shindengen Electric Manufacturing Co., Ltd., Tokyo (JP); Honda Motor Co., Ltd., Tokyo (JP)

(72) Inventors: Naoya Imai, Hanno (JP); Masataka Ikeda, Hanno (JP); Yasukazu Yamaguchi, Hanno (JP); Hiroyuki Eguchi, Wako (JP); Go Fujikawa, Wako (JP)

(73) Assignees: Shindengen Electric Manufacturing Co., Ltd., Tokyo (JP); Honda Motor Co., Ltd., Tokyo (JP)

( * ) Notice: Subject to any disclaimer, the term of this patent is extended or adjusted under 35 U.S.C. 154(b) by 49 days.

(21) Appl. No.: 14/773,316

(22) PCT Filed: Mar. 21, 2013

(86) PCT No.: PCT/JP2013/058152
§ 371 (c)(1),
(2) Date: Sep. 4, 2015

(87) PCT Pub. No.: WO2014/147801
PCT Pub. Date: Sep. 25, 2014

(65) Prior Publication Data
US 2016/0020684 A1 Jan. 21, 2016

(51) Int. Cl.
*H02M 1/32* (2007.01)
*H02M 1/00* (2006.01)
(Continued)

(52) U.S. Cl.
CPC ............... *H02M 1/00* (2013.01); *H02M 7/48* (2013.01); *H02M 7/53871* (2013.01);
(Continued)

(58) Field of Classification Search
CPC ........... H02M 1/32; H02M 2001/0077; H02M 7/501; H02M 7/497; H02H 7/1227; H02H 3/093; H02H 3/10
See application file for complete search history.

(56) References Cited

U.S. PATENT DOCUMENTS

2006/0012316 A1\* 1/2006 Hirata ................ H05B 41/2885
315/291
2007/0070667 A1 3/2007 Stancu et al.
(Continued)

FOREIGN PATENT DOCUMENTS

EP 1 237 272 9/2002
JP 5 219759 8/1993
(Continued)

OTHER PUBLICATIONS

International Search Report mailed on Sep. 3, 2013 for PCT/JP2013/058152 and its English translation from WIPO.
(Continued)

*Primary Examiner* — Harry Behm
(74) *Attorney, Agent, or Firm* — Ladas & Parry, LLP (57) ABSTRACT

A power supply device includes a first inverter that converts a first direct-current voltage into a first alternating-current voltage and outputs the first alternating-current voltage, and a second inverter that has an output connected in series with an output of the first inverter and converts a second direct-current voltage into a second alternating-current voltage synchronized with the first alternating-current voltage and outputs the second alternating-current voltage.

9 Claims, 5 Drawing Sheets (51) Int. Cl.
      *H02M 7/48*           (2007.01)
      *H02M 7/5387*      (2007.01)
      *H02H 3/10*           (2006.01)

(52) U.S. Cl.
     CPC ................ *H02H 3/10* (2013.01); *H02M 1/32* (2013.01); *H02M 2001/0003* (2013.01); *H02M 2001/0077* (2013.01)

(56) References Cited

U.S. PATENT DOCUMENTS

| | | | |
|---|---|---|---|
| 2008/0144342 A1* | 6/2008 | Du | H02M 7/49 363/71 |
| 2009/0103335 A1* | 4/2009 | Nakamura | H02M 3/33523 363/21.17 |
| 2011/0211282 A1* | 9/2011 | Nanov | H02M 1/32 361/18 |

FOREIGN PATENT DOCUMENTS

| | | |
|---|---|---|
| JP | 10-52052 | 2/1998 |
| JP | 2007-151228 | 6/2007 |
| JP | 2009-296858 | 12/2009 |
| JP | 2010-257841 | 11/2010 |
| JP | 2003-47296 | 2/2013 |

OTHER PUBLICATIONS

Extended European Search Report dated Feb. 13, 2017 for European Patent Application No. 13879185.0.

\* cited by examiner

POWER SUPPLY DEVICE WITH CURRENT LIMIT BASED ON OUTPUT CURRENT AND INPUT VOLTAGE

CROSS-REFERENCE TO RELATED APPLICATION(S)

This application is the U.S. National Stage of International Patent Application No. PCT/JP2013/058152 filed on Mar. 21, 2013, the disclosure of which is incorporated in its entirety herein by reference.

TECHNICAL FIELD

The present invention relates to a power supply device including two single-phase inverters that operate in series synchronization.

BACKGROUND ART

Figure 4:
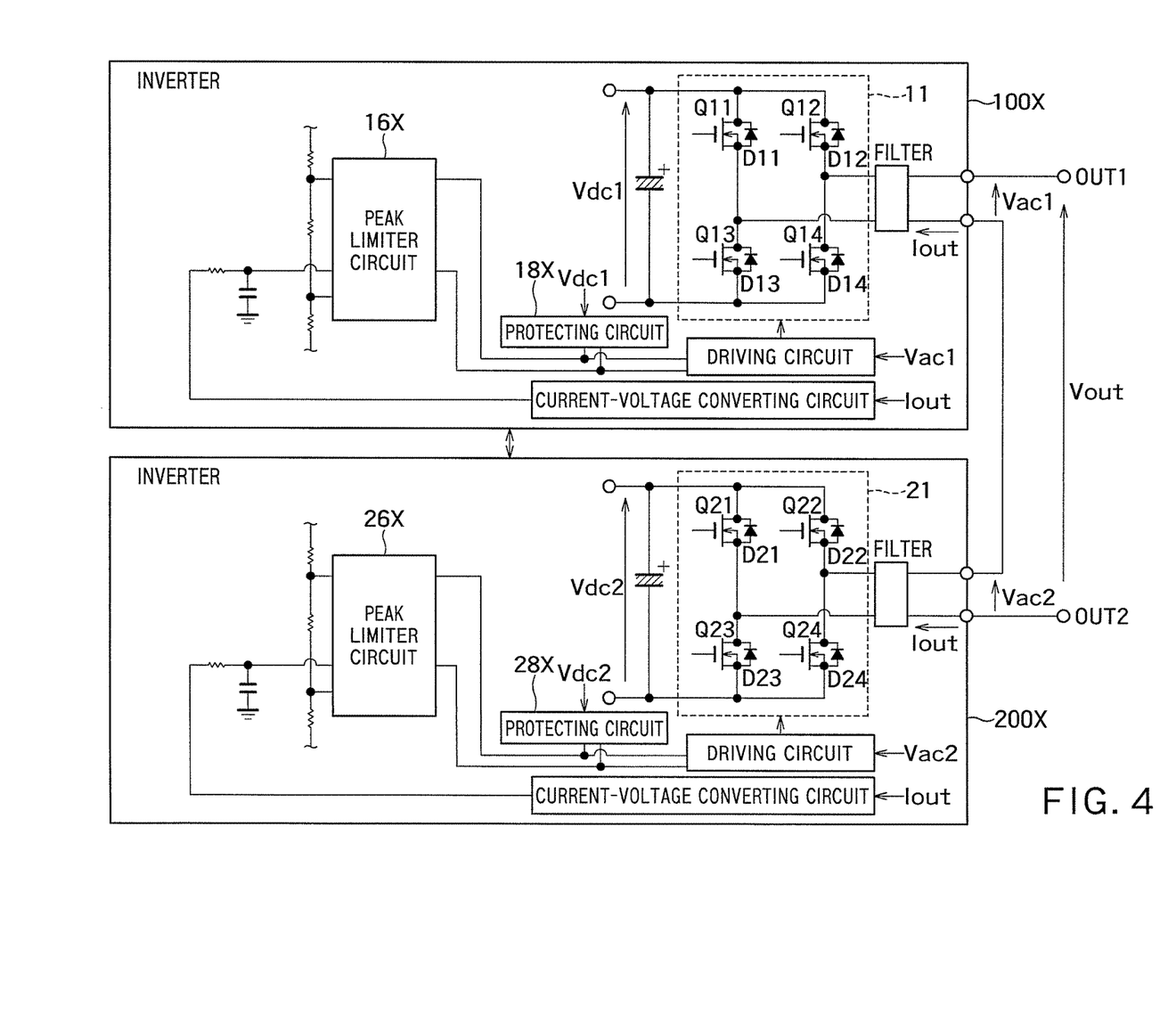
FIG. 4 is a block diagram showing a configuration of a power supply device according to an back ground art.

There is known a power supply device (a single-phase three-wire inverter) including two single-phase inverters 100X and 200X that operate in series synchronization (see FIG. 4). The two inverters 100X and 200X are electrically insulated from each other except that outputs thereof are connected in series with each other. The inverters 100X and 200X have bridge circuits 11 and 21, respectively. The bridge circuit 11 converts a direct-current voltage "Vdc1" supplied to a primary side thereof into an alternating-current voltage having a desired amplitude and outputs the alternating-current voltage by FETs "Q11" to "Q14" performing respective switching operations in accordance with a PWM signal, and the bridge circuit 21 converts a direct-current voltage "Vdc2" supplied to a primary side thereof into an alternating-current voltage having a desired amplitude and outputs the alternating-current voltage by FETs "Q21" to "Q24" performing respective switching operations in accordance with a PWM signal. The power supply device outputs an alternating-current voltage that is twice as high as alternating-current voltages "Vac1" and "Vac2" output from the inverters 100X and 200X as an output voltage "Vout" across output terminals "OUT1" and "OUT2".

The inverters 100X and 200X have peak limiter circuits 16X and 26X, respectively, and the peak limiter circuits 16X and 26X make the bridge circuits 11 and 21 stop operating, respectively, when an output current "Iout" reaches a positive limiter value and a negative limiter value. The limiter values of the two inverters 100X and 200X are independently determined. However, if the positive limiter values of the two inverters are equal to each other, and the negative limiter values of the two inverters are equal to each other, the bridge circuits 11 and 21 of the two inverters 100X and 200X stop operating when the output current "Iout" reaches any limiter value, and thereby can limit the maximum value of the output current "Iout" to the positive limiter value and the minimum value of the output current "Iout" to the negative limiter value. Therefore, damage to the FETs "Q11" to "Q14" and "Q21" to "Q24" of the bridge circuits 11 and 21 can be prevented in a situation where an excessive output current "Iout" can flow.

The inverters 100X and 200X have protecting circuits 18X and 28X, respectively, each of which forcedly stops both the inverters 100X and 200X to protect the power supply device when a short-circuit state in which the output current "Iout" reaches a limiter value has lasted for a predetermined time (several seconds, for example) or when the direct-current voltage "Vdc1" or "Vdc2" on a primary side becomes equal to or higher than an overvoltage detection value.

As a load on the power supply device, a load that requires high current in activation (a short-circuit start load), such as an incandescent lamp, can be connected to the power supply device. At the instant when current supply to such a load is started, the output terminals "OUT1" and "OUT2" of the power supply device are short-circuited, so that the output current "Iout" reaches the limiter value. However, once the load is activated, the impedance increases within the predetermined time described above, and therefore the output current "Iout" becomes lower than the limiter value. Therefore, if the positive limiter values of the two inverters 100X and 200X are equal to each other, and the negative limiter values of the two inverters 100X and 200X are equal to each other, the power supply device can keep supplying current to the load without stopping operating.

Another known device similar to the power supply device described above is described in Japanese Patent Laid-Open No. 2003-047296.

DISCLOSURE OF THE INVENTION

Technical Problem

Figure 5:
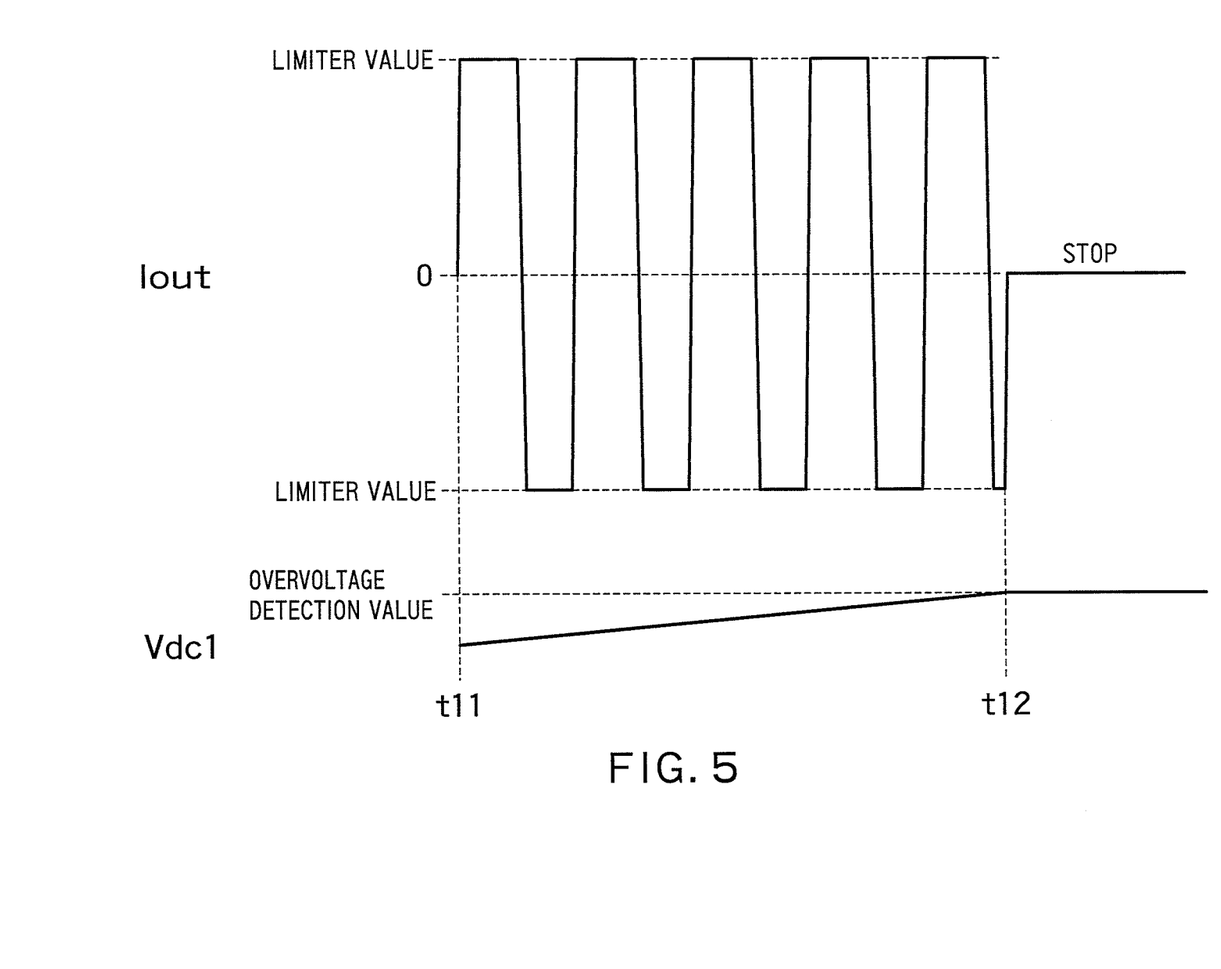
FIG. 5 is a waveform diagram showing the output current and the first direct-current voltage of the power supply device according to the back ground art.

However, due to variations of circuit elements or the like, the positive limiter values of the two inverters 100X and 200X often differ from each other, and the negative limiter values of the two inverters 100X and 200X also differ from each other. As shown in FIG. 5, if the limiter values differ from each other, at the instant when current supply to the load that requires high current in activation is started (a time "t11"), in one of the inverters the absolute value of the limiter value of which is smaller (the inverter 100X, for example), the output current "Iout" reaches the limiter value, so that the bridge circuit 11 stop operating, and the maximum value of the output current "Iout" is limited to the limiter value. On the other hand, in the other inverter 200X the absolute value of the limiter value of which is larger, the output current "Iout" does not reach the limiter value, so that the bridge circuit 21 continues operating.

Since the bridge circuit 21 in the inverter 200X continues operating, a current flows into the primary side of the inverter 100X through parasitic diodes "D11" to "D14" of the FETs "Q11" to "Q14" that are turned off in the bridge circuit 11, and therefore, the direct-current voltage "Vdc1" on the primary side increases. The same operation occurs when the output current "Iout" is negative.

As such operations are repeated, the direct-current voltage "Vdc1" on the primary side of the inverter 100X increases. And when the direct-current voltage "Vdc1" reaches an overvoltage detection value (a time "t12"), the protecting circuit 18X of the inverter 100X makes both the inverters 100X and 200X stop operating. That is, the output voltage "Vout" and the output current "Iout" become zero. Therefore, the load that requires high current in activation cannot be driven.

In view of such circumstances, an object of the present invention is to provide a power supply device that can drive a load that requires high current in activation while preventing a direct-current voltage on a primary side from excessively increasing.

Solution to Problem

A power supply device according to an embodiment of an aspect of the present invention, comprising:

a first inverter that converts a first direct-current voltage into a first alternating-current voltage based on a switching operation of a plurality of first switching elements forming a first bridge circuit and outputs the first alternating-current voltage; and a second inverter that converts a second direct-current voltage into a second alternating-current voltage synchronized with the first alternating-current voltage based on a switching operation of a plurality of second switching elements forming a second bridge circuit and outputs the second alternating-current voltage, wherein the first inverter has:

a first limiter value setting part that sets a first limiter value;

a first peak limiter circuit that inhibits the first switching elements from performing the switching operation when a value that is responsive to an output current reaches the first limiter value, and makes the first switching elements perform the switching operation when the value that is responsive to the output current is lower than the first limiter value; and a first controlling part that increases the first limiter value based on an increase of the value that is responsive to the output current and the first direct-current voltage, and the second inverter has:

a second limiter value setting part that sets a second limiter value;

a second peak limiter circuit that inhibits the second switching elements from performing the switching operation when the value that is responsive to the output current reaches the second limiter value, and makes the second switching elements perform the switching operation when the value that is responsive to the output current is lower than the second limiter value; and a second controlling part that increases the second limiter value based on an increase of the value that is responsive to the output current and the second direct-current voltage.

In the power supply device, the first limiter value setting part sets the first limiter value, which is positive, and a third limiter value, which is negative, the first peak limiter circuit inhibits the first switching elements from performing the switching operation when the value that is responsive to the output current reaches the first limiter value or the third limiter value, and makes the first switching elements perform the switching operation when the value that is responsive to the output current is lower than the first limiter value and higher than the third limiter value, the first controlling part increases the first limiter value and reduces the third limiter value based on the increase of the value that is responsive to the output current and the first direct-current voltage, the second limiter value setting part sets the second limiter value, which is positive, and a fourth limiter value, which is negative, the second peak limiter circuit inhibits the second switching elements from performing the switching operation when the value that is responsive to the output current reaches the second limiter value or the fourth limiter value, and makes the second switching elements perform the switching operation when the value that is responsive to the output current is lower than the second limiter value and higher than the fourth limiter value, and the second controlling part increases the second limiter value and reduces the fourth limiter value based on the increase of the value that is responsive to the output current and the second direct-current voltage.

In the power supply device, the first controlling part increases the first limiter value and reduces the third limiter value when a state where the value that is responsive to the output current is equal to or higher than a first predefined current value previously determined and the first direct-current voltage is equal to or higher than a first predefined voltage value previously determined lasts for a first predefined time previously determined, and the second controlling part increases the second limiter value and reduces the fourth limiter value when a state where the value that is responsive to the output current is equal to or higher than a second predefined current value previously determined and the second direct-current voltage is equal to or higher than a second predefined voltage value previously determined lasts for the first predefined time.

In the power supply device, the first predefined current value is higher than a rated current value of the first and second inverters and equal to or lower than the first limiter value, and the second predefined current value is higher than the rated current value and equal to or lower than the second limiter value.

In the power supply device, the first controlling part reduces the first limiter value and increases the third limiter value when a state where the value that is responsive to the output current is equal to or higher than the first predefined current value and the first direct-current voltage is lower than the first predefined voltage value lasts for a second predefined time previously determined, and the second controlling part reduces the second limiter value and increases the fourth limiter value when a state where the value that is responsive to the output current is equal to or higher than the second predefined current value and the second direct-current voltage is lower than the second predefined voltage value lasts for the second predefined time.

In the power supply device, the first controlling part reduces the first limiter value and increases the third limiter value when a state where the value that is responsive to the output current is lower than the first predefined current value lasts for a third predefined time previously determined, and the second controlling part reduces the second limiter value and increases the fourth limiter value when a state where the value that is responsive to the output current is lower than the second predefined current value lasts for the third predefined time.

In the power supply device, the first controlling part changes the first and third limiter value within respective previously determined ranges, and the second controlling part changes the second and fourth limiter values within respective previously determined ranges.

In the power supply device, the first inverter has a first protecting circuit that turns off the first and second switching elements when a state where the value that is responsive to the output current reaches the first limiter value or the third limiter value lasts for a previously determined short-circuit detection time or when the first direct-current voltage is equal to or higher than a first overvoltage detection value previously determined, the first overvoltage detection value is higher than the first predefined voltage value, the second inverter has a second protecting circuit that turns off the first and second switching elements when a state where the value that is responsive to the output current reaches the second limiter value or the fourth limiter value lasts for the short-circuit detection time or when the second direct-current voltage is equal to or higher than a second overvoltage detection value previously determined, and the second overvoltage detection value is higher than the second predefined voltage value.

In the power supply device, wherein the first inverter has a first current-voltage converting circuit that converts the value that is responsive to the output current into a first detected voltage, the first limiter value setting part has:

a first PWM part that generates first and third PWM signals having a pulse width responsive to control by the first controlling part; and a first smoothing circuit that smooths the first PWM signal to generate a first reference voltage that corresponds to the first limiter value, and smooths the third PWM signal to generate a third reference voltage that corresponds to the third limiter value, the first peak limiter circuit determines a relationship between the value that is responsive to the output current and the first and third limiter values based on the first detected voltage and the first and third reference voltages, the second inverter has a second current-voltage converting circuit that converts the value that is responsive to the output current into a second detected voltage, the second limiter value setting part has:

a second PWM part that generates second and fourth PWM signals having a pulse width responsive to control by the second controlling part; and a second smoothing circuit that smooths the second PWM signal to generate a second reference voltage that corresponds to the second limiter value, and smooths the fourth PWM signal to generate a fourth reference voltage that corresponds to the fourth limiter value, and the second peak limiter circuit determines a relationship between the value that is responsive to the output current and the second and fourth limiter values based on the second detected voltage and the second and fourth reference voltages.

Advantageous Effects of Invention

According to the present invention, the first controlling part of the first inverter and the second controlling part of the second inverter are each configured to increase the associated limiter value based on an increase of the value that is responsive to the output current and the associated direct-current voltage.

Therefore, if the first limiter value of the first inverter is smaller than the second limiter value of the second inverter, for example, after current supply to a load that requires high current in activation is started, the value that is responsive to the output current reaches the first limiter value, and the first switching element is turned off and stops the switching operation. At this point in time, the second switching element is in the on state, so that the first direct-current voltage increases, and the first controlling part increases the first limiter value. As the first limiter value becomes higher than the second limiter value, the first switching element resumes the switching operation, so that a current flows through the first switching element in the on state, and the first direct-current voltage on the primary side decreases.

In this way, a load that requires high current in activation can be driven while preventing the direct-current voltage on the primary side from excessively increasing.

DESCRIPTION OF EMBODIMENT

In the following, an embodiment of the present invention will be described with reference to the drawings. The embodiment is not intended to limit the present invention.

Figure 1:
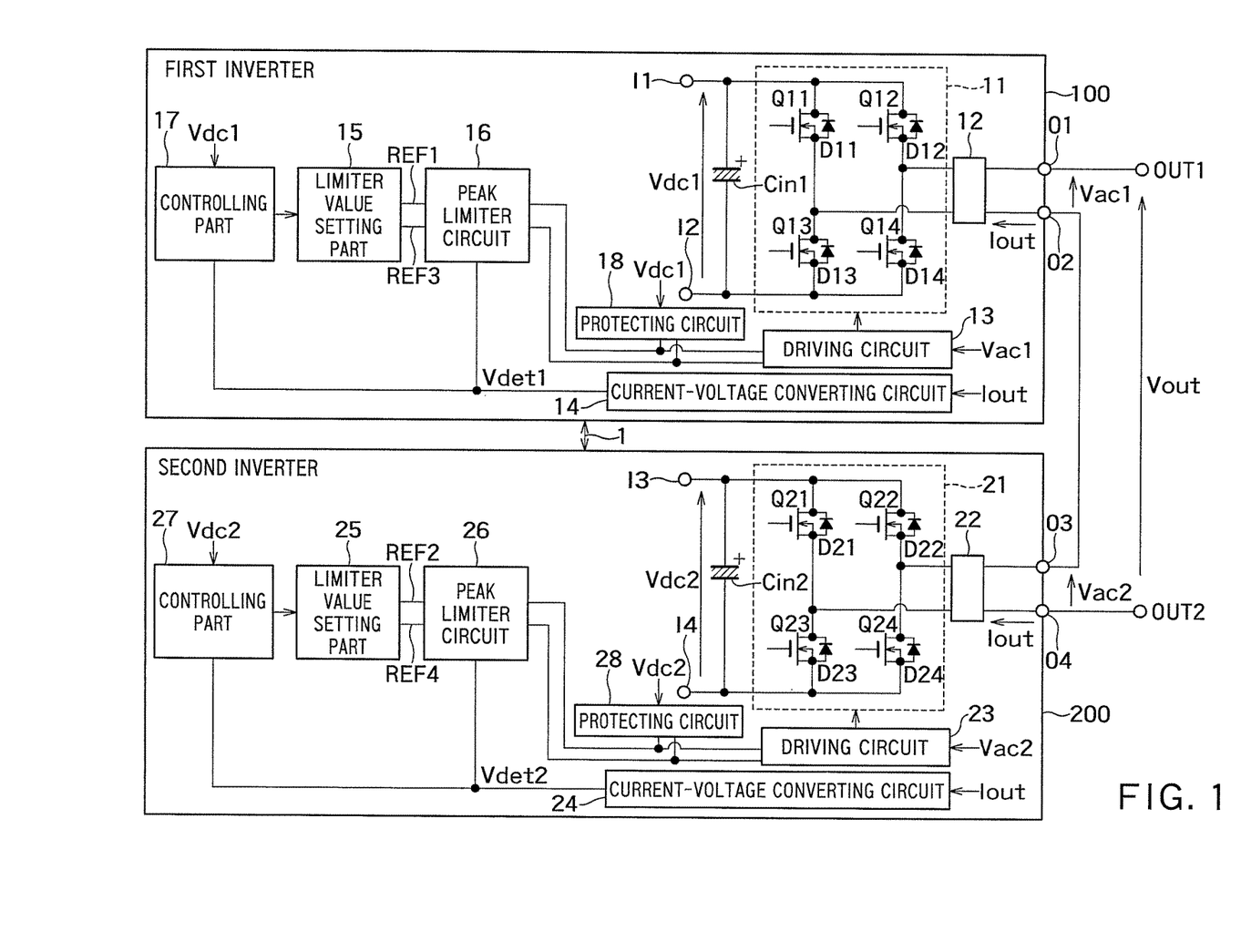
FIG. 1 is a block diagram showing a configuration of a power supply device according to an embodiment of the present invention.

FIG. 1 is a block diagram showing a configuration of a power supply device according to an embodiment of the present invention. As shown in FIG. 1, the power supply device includes a first inverter 100 and a second inverter 200.

The first inverter 100 and the second inverter 200 are connected to each other by a communication line 1, and the communication line 1 transmits a control signal and a synchronization signal for synchronized operation of the first and second inverters. The first inverter 100 operates as a master, and the second inverter 200 operates as a slave.

A direct-current power is supplied to input terminals "I1" and "I2" of the first inverter 100 and to input terminals "I3" and "I4" of the second inverter 200. For example, an alternating-current power generated by an engine generator (not shown) may be converted into a direct-current power, and the resulting direct-current power may be supplied to the first inverter 100 and the second inverter 200.

In response to switching operations of four first switching elements "Q11" to "Q14" forming a first bridge circuit 11, the first inverter 100 converts a first direct-current voltage "Vdc1" between the input terminals "I1" and "I2" into a first alternating-current voltage "Vac1" and outputs the first alternating-current voltage "Vac1" across output terminals "O1" and "O2".

In response to switching operations of four second switching elements "Q21" to "Q24" forming a second bridge circuit 21, the second inverter 200 converts a second direct-current voltage "Vdc2" between the input terminals "I3" and "I4" into a second alternating-current voltage "Vac2" synchronized with the first alternating-current voltage "Vac1" and outputs the second alternating-current voltage "Vac2" across output terminals "O3" and "O4".

An output of the second inverter 200 is connected in series with an output of the first inverter 100. More specifically, the output terminal "O2" of the first inverter 100 and the output terminal "O3" of the second inverter 200 are connected to each other, the output terminal "O1" of the first inverter 100 is connected to an alternating-current output terminal "OUT1", and the output terminal "O4" of the second inverter 200 is connected to an alternating-current output terminal "OUT2". The power supply device outputs an alternating-current voltage that is twice as high as the alternating-current voltages "Vac1" and "Vac2" output by the inverters 100 and 200 as an output voltage "Vout" across the output terminals "OUT1" and "OUT2".

Next, a configuration of the first inverter 100 and a configuration of the second inverter 200 will be described.

The first inverter 100 has a first input capacitor "Cin1", a first bridge circuit 11, a first filter 12, a first driving circuit 13, a first current-voltage converting circuit 14, a first limiter value setting part 15, a first peak limiter circuit 16, a first controlling part 17, and a first protecting circuit 18.

The first input capacitor "Cin1" is connected between the input terminals "I1" and "I2".

The first bridge circuit 11 is a full-bridge circuit and has four first switching elements "Q11" to "Q14", which are N-type MOSFETs, and four parasitic diodes "D11" to "D14". The first switching elements "Q11" and "Q13" are connected in series between the input terminals "I1" and "I2". The first switching elements "Q12" and "Q14" are also connected in series between the input terminals "I1" and "I2". Each of the parasitic diodes "D11" to "D14" is connected to a source of a corresponding one of the first switching elements "Q11" to "Q14" at an anode thereof and to a drain of the corresponding one of the first switching elements "Q11" to "Q14" at a cathode thereof.

A point of connection between the source of the first switching element "Q11" and the drain of the first switching element "Q13" is connected to the output terminal "O2" via the first filter 12.

A point of connection between the source of the first switching element "Q12" and the drain of the first switching element "Q14" is connected to the output terminal "O1" via the first filter 12.

The first filter 12 is formed by an inductor and a capacitor, for example, and is intended to remove a harmonic from an output voltage of the first bridge circuit 11 to provide the first alternating-current voltage "Vac1" having a waveform close to a sine wave.

The first driving circuit 13 outputs a first driving signal that is pulse-width modulated to gates of the first switching elements "Q11" to "Q14" so as to set the first alternating-current voltage "Vac1" at a desired value. In response to the first driving signal, the first switching elements "Q11" to "Q14" perform respective switching operations.

The first driving circuit 13 outputs a synchronization signal that synchronizes the first alternating-current voltage "Vac1" and the second alternating-current voltage "Vac2". The synchronization signal is supplied to a second driving circuit 23 of the second inverter 200 via the communication line 1.

The first current-voltage converting circuit 14 converts an output current "Iout" flowing through the output terminal "O2" into a first detected voltage "Vdet1". In the following description, the term "output current 'Iout'" can be interchanged with a phrase "value that is responsive to the output current 'Iout'".

Since the outputs of the first inverter 100 and the second inverter 200 are connected in series with each other, the output current "Iout" flows through each of the output terminals "O1" to "O4".

The first limiter value setting part 15 sets a first limiter value, which is positive, and a third limiter value, which is negative. In this embodiment, the first limiter value setting part 15 generates a first reference voltage "REF1" that corresponds to the first limiter value and a third reference voltage "REF3" that corresponds to the third limiter value.

The first peak limiter circuit 16 controls the first driving circuit 13 in accordance with the relationship between the output current "Iout" and the first and third limiter values, thereby controlling whether to make the first switching elements "Q11" to "Q14" perform the respective switching operations.

When the output current "Iout" reaches the first limiter value or the third limiter value, the first peak limiter circuit 16 turns off all the first switching elements "Q11" to "Q14", and the first switching elements "Q11" to "Q14" do not perform the respective switching operations. On the other hand, when the output current "Iout" is lower than the first limiter value and higher than the third limiter value, the first peak limiter circuit 16 makes the first switching elements "Q11" to "Q14" perform the respective switching operations.

In this embodiment, the first peak limiter circuit 16 determines the relationship between the output current "Iout" and the first and third limiter values based on the first detected voltage "Vdet1", the first reference voltage "REF1" and the third reference voltage "REF3".

The first controlling part 17 receives the first detected voltage "Vdet1" and the first direct-current voltage "Vdc1", and makes the first limiter value setting part 15 increase the first limiter value and reduce the third limiter value in accordance with an increase of the output current "Iout" and the first direct-current voltage "Vdc1". The first controlling part 17 changes the first and third limiter values within respective previously determined ranges (a range of ±several amperes, for example). That is, the first and third limiter values have respective upper and lower limits. A specific operation of the first controlling part 17 will be described later along with a specific operation of a second controlling part 27 of the second inverter 200.

The first protecting circuit 18 receives an output signal of the first peak limiter circuit 16 and the first direct-current voltage "Vdc1" and makes the first driving circuit 13 and the second driving circuit 23 of the second inverter 200 stop operating when a previously determined short-circuit detection time (several seconds, for example) has elapsed since the output current "Iout" reached the first or third limiter value or when the first direct-current voltage "Vdc1" becomes equal to or higher than a previously determined first overvoltage detection value. In this way, the first protecting circuit 18 turns off all the first switching elements "Q11" to "Q14" and the second switching elements "Q21" to "Q24" to inhibit the switching elements from performing respective switching operations. The first overvoltage detection value is higher than a first predefined voltage value.

A basic configuration of the second inverter 200 is the same as that of the first inverter 100.

The second inverter 200 has a second input capacitor "Cin2", a second bridge circuit 21, a second filter 22, the second driving circuit 23, a second current-voltage converting circuit 24, a second limiter value setting part 25, a second peak limiter circuit 26, a second controlling part 27, and a second protecting circuit 28.

The second input capacitor "Cin2" is connected between the input terminals "I3" and "I4".

The second bridge circuit 21 is a full-bridge circuit and has four second switching elements "Q21" to "Q24", which are N-type MOSFETs, and four parasitic diodes "D21" to "D24". The second switching elements "Q21" and "Q23" are connected in series between the input terminals "I3" and "I4". The second switching elements "Q22" and "Q24" are also connected in series between the input terminals "I3" and "I4". Each of the parasitic diodes "D21" to "D24" is connected to a source of a corresponding one of the second switching elements "Q21" to "Q24" at an anode thereof and to a drain of the corresponding one of the second switching elements "Q21" to "Q24" at a cathode thereof.

A point of connection between the source of the second switching element "Q21" and the drain of the second switching element "Q23" is connected to the output terminal "O3" via the second filter 22.

A point of connection between the source of the second switching element "Q22" and the drain of the second switching element "Q24" is connected to the output terminal "O4" via the second filter 22.

The second filter 22 has the same function as the first filter 12.

The second driving circuit 23 outputs a second driving signal that is pulse-width modulated to gates of the second switching elements "Q21" to "Q24" so as to set the second alternating-current voltage "Vac2" at a desired value. In response to the second driving signal, the second switching elements "Q21" to "Q24" perform respective switching operations. In this process, the second driving circuit 23 outputs the second driving signal synchronized with the first driving signal in accordance with the synchronization signal supplied from the first driving circuit 13 via the communication line 1.

The second current-voltage converting circuit 24 converts the output current "Iout" flowing through the output terminal "O4" into a second detected voltage "Vdet2".

The second limiter value setting part 25 sets a second limiter value, which is positive, and a fourth limiter value, which is negative. In this embodiment, the second limiter value setting part 25 generates a second reference voltage "REF2" that corresponds to the second limiter value and a fourth reference voltage "REF4" that corresponds to the fourth limiter value.

The second peak limiter circuit 26 controls the second driving circuit 23 in accordance with the relationship between the output current "Iout" and the second and fourth limiter values, thereby controlling whether to make the second switching elements "Q21" to "Q24" perform the respective switching operations.

When the output current "Iout" reaches the second limiter value or the fourth limiter value, the second peak limiter circuit 26 turns off all the second switching elements "Q21" to "Q24", and the second switching elements "Q21" to "Q24" do not perform the respective switching operations. On the other hand, when the output current "Iout" is lower than the second limiter value and higher than the fourth limiter value, the second peak limiter circuit 26 makes the second switching elements "Q21" to "Q24" perform the respective switching operations.

In this embodiment, the second peak limiter circuit 26 determines the relationship between the output current "Iout" and the second and fourth limiter values based on the second detected voltage "Vdet2", the second reference voltage "REF2" and the fourth reference voltage "REF4".

The second controlling part 27 receives the second detected voltage "Vdet2" and the second direct-current voltage "Vdc2", and makes the second limiter value setting part 25 increase the second limiter value and reduce the fourth limiter value in accordance with an increase of the output current "Iout" and the second direct-current voltage "Vdc2".

The second controlling part 27 changes the second and fourth limiter values within respective previously determined ranges. That is, the second and fourth limiter values have respective upper and lower limits.

The second protecting circuit 28 receives an output signal of the second peak limiter circuit 26 and the second direct-current voltage "Vdc2" and makes the second driving circuit 23 and the first driving circuit 13 of the first inverter 100 stop operating when a previously determined short-circuit detection time has elapsed since the output current "Iout" reached the second or fourth limiter value or when the second direct-current voltage "Vdc2" becomes equal to or higher than a previously determined second overvoltage detection value. In this way, the second protecting circuit 28 turns off all the first switching elements "Q11" to "Q14" and the second switching elements "Q21" to "Q24" to inhibit the switching elements from performing respective switching operations. The second overvoltage detection value is higher than a second predefined voltage value.

Next, with reference to FIG. 2, an operation of the power supply device will be described along with more specific operations of the first controlling part 17 and the second controlling part 27.

Figure 2:
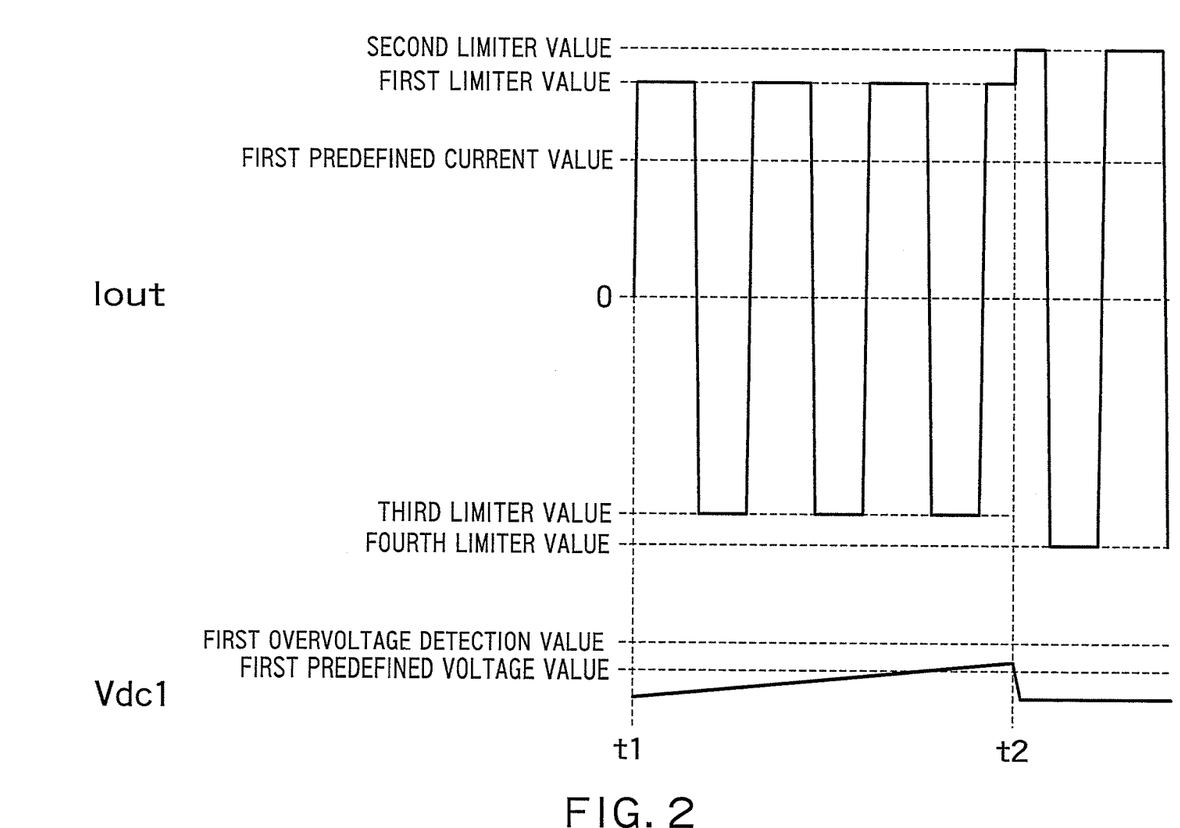
FIG. 2 is a waveform diagram showing the output current and the first direct-current voltage of the power supply device according to the embodiment of the present invention.

FIG. 2 is a waveform diagram showing the output current "Iout" and the first direct-current voltage "Vdc1" of the power supply device according to the embodiment of the present invention. The waveform diagram of FIG. 2 shows waveforms in a case where a load that requires high current in activation, such as an incandescent lamp, is connected to the power supply device. Furthermore, the waveforms shown in FIG. 2 are those in a case where the positive first limiter value is lower than the positive second limiter value, and the negative third limiter value is higher than the negative fourth limiter value due to variations of circuit elements in the initial state.

In the example shown in this drawing, at a time "t1", current supply to a load that requires high current in activation is started, and the output terminals "OUT1" and "OUT2" of the power supply device are short-circuited. Therefore, after the time "t1", in the first inverter 100, when the output current "Iout" reaches the first or third limiter value, the first switching elements "Q11" to "Q14" are turned off, the maximum value of the output current "Iout" is limited to the first limiter value, and the minimum value of the output current "Iout" is limited to the third limiter value.

Since the output current "Iout" is limited by the first inverter 100 as described above, the output current "Iout" does not reach the second and fourth limiter values in the second inverter 200. Therefore, in the second inverter 200, the second switching elements "Q21" to "Q24" continue operating even after the time "t1" as in the normal operation.

Since the second switching elements "Q21" to "Q24" continue operating, a current flows through the primary side of the first inverter 100 through the parasitic diodes "D11" to "D14", and therefore, the first direct-current voltage "Vdc1" on the primary side gradually increases.

The first controlling part 17 is configured to increase the first limiter value by a previously determined amount and reduce the third limiter value by a previously determined amount when a state where the output current "Iout" is equal to or higher than a first predefined current value previously determined and the first direct-current voltage "Vdc1" is equal to or higher than a first predefined voltage value previously determined has lasted for a first predefined time previously determined. The first predefined current value is higher than rated current values of the first and second inverters and equal to or lower than the first limiter value.

In the example shown in the drawing, at a time "t2", the condition described above is satisfied, and the first controlling part 17 increases the first limiter value by a predetermined amount and reduce the third limiter value by a predetermined amount. As a result, the first limiter value becomes higher than the second limiter value, the third limiter value becomes lower than the fourth limiter value, and then, the first switching elements "Q11" to "Q14" resume performing the respective switching operations. A current flows through the first switching element turned on, and the first direct-current voltage "Vdc1" on the primary side decreases to the voltage in the initial state in a time shorter than the time required for the first direct-current voltage to increase.

In the second inverter 200, on the other hand, after the time "t2", the output current "Iout" reaches the second and fourth limiter values, so that the second switching elements "Q21" to "Q24" are turned off, and the maximum value of the output current "Iout" is limited to the second limiter value, and the minimum value of the output current "Iout" is limited to the fourth limiter value.

As a result, although not shown in the drawing, a current flows through the primary side of the second inverter 200 through the parasitic diodes "D21" to "D24", and the second direct-current voltage "Vdc2" gradually increases.

The second controlling part 27 is configured to increase the second limiter value by a predetermined amount and reduce the fourth limiter value by a predetermined amount when a state where the output current "Iout" is equal to or higher than a second predefined current value previously determined and the second direct-current voltage "Vdc2" is equal to or higher than a second predefined voltage value previously determined has lasted for the first predefined time.

The second predefined current value is higher than the rated current value and equal to or lower than the second limiter value. The second predefined current value can be equal to the first predefined current value. The first and second predefined current values can be twice as high as the rated current value, for example.

As the second limiter value increases, and the fourth limiter value decreases, the second limiter value becomes higher than the first limiter value again, and the fourth limiter value becomes lower than the third limiter value again. As a result, the second switching elements "Q21" to "Q24" resume performing the respective switching operations, so that the second direct-current voltage "Vdc2" decreases in a short time.

Repeating such operations prevents the first direct-current voltage "Vdc1" from reaching the first overvoltage detection value and the second direct-current voltage "Vdc2" from reaching the second overvoltage detection value. Therefore, there is no possibility that the first protecting circuit 18 or the second protecting circuit 28 makes the first inverter 100 or the second inverter 200 stop operating.

Once such a load is activated, the impedance increases within a short-circuit detection time, so that the output current "Iout" decreases to become lower than the rated current and no longer reaches the first to fourth limiter values. That is, the short-circuit between the output terminals "OUT1" and "OUT2" is removed, and the power supply device can keep supplying current to the load in the normal operation.

As described above, according to this embodiment, even if the first and third limiter values differ from each other and the second and fourth limiter values differ from each other due to variations of the circuit elements or environmental variations, such as temperature change or aging, a load that requires high current in activation can be driven while preventing the first direct-current voltage "Vdc1" and the second direct-current voltage "Vdc2" on the primary side from excessively increasing.

The first controlling part 17 may be configured to reduce the first limiter value by a predetermined amount and increase the third limiter value by a predetermined amount when a state where the output current "Iout" is equal to or higher than the first predefined current value and the first direct-current voltage "Vdc1" is lower than the first predefined voltage value has lasted for a second predefined time previously determined.

Similarly, the second controlling part 27 may be configured to reduce the second limiter value by a predetermined amount and increase the fourth limiter value by a predetermined amount when a state where the output current "Iout" is equal to or higher than the second predefined current value and the second direct-current voltage "Vdc2" is lower than the second predefined voltage value has lasted for the second predefined time.

In that case, adjusting the first and second predefined times can prevent the first and second limiter values from keep increasing during the short-circuit state and the third and fourth limiter values from keeping decreasing during the short-circuit state.

Furthermore, the first controlling part 17 may be configured to reduce the first limiter value by a predetermined amount and increase the third limiter value by a predetermined amount when a state where the output current "Iout" is lower than the first predefined current value has lasted for a third predefined time previously determined.

Similarly, the second controlling part 27 may be configured to reduce the second limiter value by a predetermined amount and increase the fourth limiter value by a predetermined amount when a state where the output current "Iout" is lower than the second predefined current value has lasted for the third predefined time.

In that case, even if the short-circuit state is established by driving the load that requires high current in activation, so that the first and second limiter values become higher than the values in the initial state, and the third and fourth limiter values become lower than the values in the initial state, the first and second limiter values can be reduced to the respective lower limits, and the third and fourth limiter values can be increased to the respective upper limits, since the normal operation continues in which the output current "Iout" is lower than the first and second predefined current values. Therefore, when the load that requires high current in activation is driven again, the first to fourth limiter values can be adjusted in wider ranges.

The first to third predefined times may be set to be equal to each other or be set to differ from each other.

Even when the load that requires high current in activation is not connected to the power supply device, and the output terminals "OUT1" and "OUT2" of the power supply device are actually short-circuited, the power supply device operates in the same manner as described above. In this case, however, the first protecting circuit 18 and the second protecting circuit 28 make the first driving circuit 13 and the second driving circuit 23 stop operating when the short-circuit state lasts for the short-circuit detection time. That is, in this case, the operation of the power supply device itself is stopped to prevent the output voltage "Vout" and the output current "Iout" from being output as with the conventional power supply device, so that the safety is ensured.

(Specific Example of Circuit Configuration)

Figure 3:
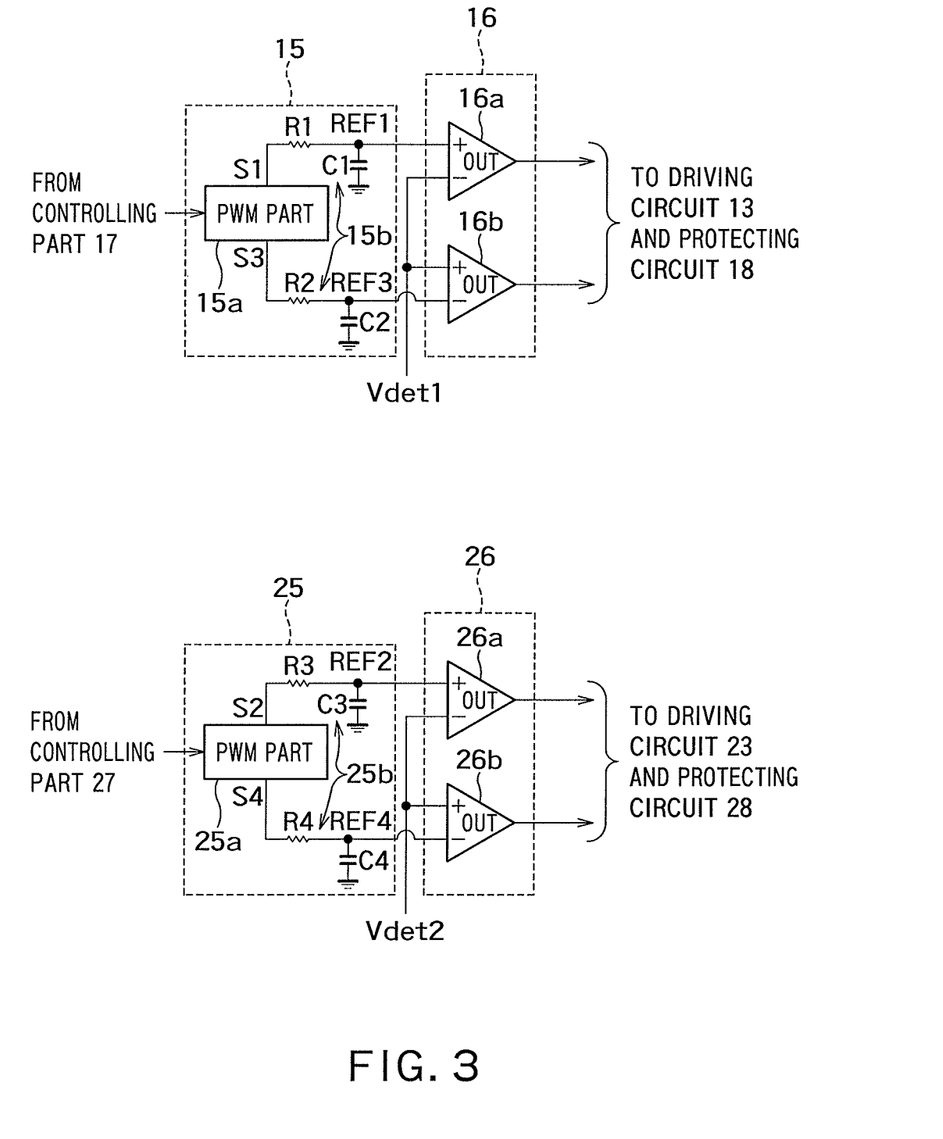
FIG. 3 is a diagram showing an example of a circuit configuration of the first limiter value setting part and the second limiter value setting part and an example of a circuit configuration of the first peak limiter circuit and the second peak limiter circuit.

The first limiter value setting part 15 and the second limiter value setting part 25 and the first peak limiter circuit 16 and the second peak limiter circuit 26 described above may be configured as described below, for example.

FIG. 3 is a diagram showing an example of a circuit configuration of the first limiter value setting part 15 and the second limiter value setting part 25 and an example of a circuit configuration of the first peak limiter circuit 16 and the second peak limiter circuit 26.

As shown in FIG. 3, the first limiter value setting part 15 has a first PWM part 15*a* and a first smoothing circuit 15*b*.

The first PWM part 15*a* generates a first PWM signal "S1" and a third PWM signal "S3" that have a pulse width responsive to control by the first controlling part 17. The first PWM part 15*a* may be formed by a microcomputer, for example.

The first smoothing circuit 15*b* generates the first reference voltage "REF1" that corresponds to the first limiter value by a low pass filter formed by a resistor "R1" and a capacitor "C1" smoothing the first PWM signal "S1". In addition, the first smoothing circuit 15*b* generates the third reference voltage "REF3" that corresponds to the third limiter value by a low pass filter formed by a resistor "R2" and a capacitor "C2" smoothing the third PWM signal "S3".

The first peak limiter circuit 16 has a comparator 16*a* that receives the first reference voltage "REF1" at a non-inverting input terminal thereof and the first detected voltage "Vdet1" at an inverting input terminal thereof and a comparator 16*b* that receives the third reference voltage "REF3" at an inverting input terminal thereof and the first detected voltage "Vdet1" at a non-inverting input terminal thereof. Output terminals of the comparators 16*a* and 16*b* are connected to the first driving circuit 13 and the first protecting circuit 18. The comparators 16*a* and 16*b* determine the relationship between the output current "Iout" and the first and third limiter values based on the first detected voltage "Vdet1", the first reference voltage "REF1" and the third reference voltage "REF3".

The second limiter value setting part 25 has a second PWM part 25*a* and a second smoothing circuit 25*b*.

The second PWM part 25*a* generates a second PWM signal "S2" and a fourth PWM signal "S4" that have a pulse width responsive to control by the second controlling part 27. The second PWM part 25*a* may also be formed by a microcomputer, for example.

The second smoothing circuit 25*b* generates the second reference voltage "REF2" that corresponds to the second limiter value by a low pass filter formed by a resistor "R3" and a capacitor "C3" smoothing the second PWM signal "S2". In addition, the second smoothing circuit 25*b* generates the fourth reference voltage "REF4" that corresponds to the fourth limiter value by a low pass filter formed by a resistor "R4" and a capacitor "C4" smoothing the fourth PWM signal "S4".

The second peak limiter circuit 26 has a comparator 26*a* that receives the second reference voltage "REF2" at a non-inverting input terminal thereof and the second detected voltage "Vdet2" at an inverting input terminal thereof and a comparator 26*b* that receives the fourth reference voltage "REF4" at an inverting input terminal thereof and the second detected voltage "Vdet2" at a non-inverting input terminal thereof. Output terminals of the comparators 26*a* and 26*b* are connected to the second driving circuit 23 and the second protecting circuit 28. The comparators 26*a* and 26*b* determine the relationship between the output current "Iout" and the second and fourth limiter values based on the second detected voltage "Vdet2", the second reference voltage "REF2" and the fourth reference voltage "REF4".

With such circuit configurations, the same advantageous effects as those of the configuration shown in FIG. 1 can be provided.

(Modifications)

For example, the first limiter value setting part 15 and the second limiter value setting part 25 may be formed by a D/A converter or the like, since it is essential only that the first limiter value setting part 15 and the second limiter value setting part 25 can generate the first to fourth reference voltages "REF1" to "REF4" responsive to control by the first controlling part 17 and the second controlling part 27.

The first switching elements "Q11" to "Q14" and the second switching elements "Q21" to "Q24" may be another switching element having a parasitic diode, such as IGBT.

Aspects of the present invention are not limited to the embodiment described above but include various modifications that can occur to those skilled in the art, and advantageous effects of the present invention are not limited to those described above. That is, various additions, modifications partial omissions are possible without departing from the conceptual spirit and scope of the present invention that are derived from the contents of the claims and equivalents thereof.

REFERENCE SIGNS LIST

Cin1 first input capacitor
11 first bridge circuit
12 first filter
13 first driving circuit
14 first current-voltage converting circuit
15 first limiter value setting part
15*a* first PWM part
15*b* first smoothing circuit
16 first peak limiter circuit
17 first controlling part
18 first protecting circuit
100 first inverter
Cin2 second input capacitor
21 second bridge circuit
22 second filter
23 second driving circuit
24 second current-voltage converting circuit
25 second limiter value setting part
25*a* second PWM part
25*b* second smoothing circuit
26 second peak limiter circuit
27 second controlling part
28 second protecting circuit
200 second inverter

The invention claimed is:

1. A power supply device, comprising:
a first inverter that converts a first direct-current voltage into a first alternating-current voltage based on a switching operation of a plurality of first switching elements forming a first bridge circuit and outputs the first alternating-current voltage; and
a second inverter that converts a second direct-current voltage into a second alternating-current voltage synchronized with the first alternating-current voltage based on a switching operation of a plurality of second switching elements forming a second bridge circuit and outputs the second alternating-current voltage, wherein the first inverter has:
a first limiter value setting part that sets a first limiter value;
a first peak limiter circuit that inhibits the first switching elements from performing the switching operation when a value that is responsive to an output current reaches the first limiter value, and makes the first switching elements perform the switching operation when the value that is responsive to the output current is lower than the first limiter value; and
a first controlling part that increases the first limiter value based on an increase of the value that is responsive to the output current and the first direct-current voltage, and the second inverter has:
a second limiter value setting part that sets a second limiter value;
a second peak limiter circuit that inhibits the second switching elements from performing the switching operation when the value that is responsive to the output current reaches the second limiter value, and makes the second switching elements perform the switching operation when the value that is responsive to the output current is lower than the second limiter value; and
a second controlling part that increases the second limiter value based on an increase of the value that is responsive to the output current and the second direct-current voltage.

2. The power supply device according to claim 1, wherein the first limiter value setting part sets the first limiter value, which is positive, and a third limiter value, which is negative,
the first peak limiter circuit inhibits the first switching elements from performing the switching operation when the value that is responsive to the output current reaches the first limiter value or the third limiter value, and makes the first switching elements perform the switching operation when the value that is responsive to the output current is lower than the first limiter value and higher than the third limiter value,
the first controlling part increases the first limiter value and reduces the third limiter value based on the increase of the value that is responsive to the output current and the first direct-current voltage,
the second limiter value setting part sets the second limiter value, which is positive, and a fourth limiter value, which is negative,
the second peak limiter circuit inhibits the second switching elements from performing the switching operation when the value that is responsive to the output current reaches the second limiter value or the fourth limiter value, and makes the second switching elements perform the switching operation when the value that is responsive to the output current is lower than the second limiter value and higher than the fourth limiter value, and
the second controlling part increases the second limiter value and reduces the fourth limiter value based on the increase of the value that is responsive to the output current and the second direct-current voltage.

3. The power supply device according to claim 2, wherein the first controlling part increases the first limiter value and reduces the third limiter value when a state where the value that is responsive to the output current is equal to or higher than a first predefined current value previously determined and the first direct-current voltage is equal to or higher than a first predefined voltage value previously determined lasts for a first predefined time previously determined, and
the second controlling part increases the second limiter value and reduces the fourth limiter value when a state where the value that is responsive to the output current is equal to or higher than a second predefined current value previously determined and the second direct-current voltage is equal to or higher than a second predefined voltage value previously determined lasts for the first predefined time.

4. The power supply device according to claim 3, wherein the first predefined current value is higher than a rated current value of the first and second inverters and equal to or lower than the first limiter value, and
the second predefined current value is higher than the rated current value and equal to or lower than the second limiter value.

5. The power supply device according to claim 3 or 4, wherein the first controlling part reduces the first limiter value and increases the third limiter value when a state where the value that is responsive to the output current is equal to or higher than the first predefined current value and the first direct-current voltage is lower than the first predefined voltage value lasts for a second predefined time previously determined, and
the second controlling part reduces the second limiter value and increases the fourth limiter value when a state where the value that is responsive to the output current is equal to or higher than the second predefined current value and the second direct-current voltage is lower than the second predefined voltage value lasts for the second predefined time.

6. The power supply device according to any one of claims 3 to 5, wherein the first controlling part reduces the first limiter value and increases the third limiter value when a state where the value that is responsive to the output current is lower than the first predefined current value lasts for a third predefined time previously determined, and
the second controlling part reduces the second limiter value and increases the fourth limiter value when a state where the value that is responsive to the output current is lower than the second predefined current value lasts for the third predefined time.

7. The power supply device according to any one of claims 3 to 6, wherein the first controlling part changes the first and third limiter value within respective previously determined ranges, and
the second controlling part changes the second and fourth limiter values within respective previously determined ranges.

8. The power supply device according to any one of claims 3 to 7, wherein the first inverter has a first protecting circuit that turns off the first and second switching elements when a state where the value that is responsive to the output current reaches the first limiter value or the third limiter value lasts for a previously determined short-circuit detection time or when the first direct-current voltage is equal to or higher than a first overvoltage detection value previously determined,
the first overvoltage detection value is higher than the first predefined voltage value,
the second inverter has a second protecting circuit that turns off the first and second switching elements when a state where the value that is responsive to the output current reaches the second limiter value or the fourth limiter value lasts for the short-circuit detection time or when the second direct-current voltage is equal to or higher than a second overvoltage detection value previously determined, and the second overvoltage detection value is higher than the second predefined voltage value.

9. The power supply device according to any one of claims 3 to 8, wherein the first inverter has a first current-voltage converting circuit that converts the value that is responsive to the output current into a first detected voltage, the first limiter value setting part has:

a first PWM part that generates first and third PWM signals having a pulse width responsive to control by the first controlling part; and a first smoothing circuit that smooths the first PWM signal to generate a first reference voltage that corresponds to the first limiter value, and smooths the third PWM signal to generate a third reference voltage that corresponds to the third limiter value, the first peak limiter circuit determines a relationship between the value that is responsive to the output current and the first and third limiter values based on the first detected voltage and the first and third reference voltages, the second inverter has a second current-voltage converting circuit that converts the value that is responsive to the output current into a second detected voltage, the second limiter value setting part has:

a second PWM part that generates second and fourth PWM signals having a pulse width responsive to control by the second controlling part; and a second smoothing circuit that smooths the second PWM signal to generate a second reference voltage that corresponds to the second limiter value, and smooths the fourth PWM signal to generate a fourth reference voltage that corresponds to the fourth limiter value, and the second peak limiter circuit determines a relationship between the value that is responsive to the output current and the second and fourth limiter values based on the second detected voltage and the second and fourth reference voltages.

* * * * *